United States Patent
Ha et al.

(10) Patent No.: US 7,911,538 B2
(45) Date of Patent: Mar. 22, 2011

(54) ESTIMATION OF BLOCK ARTIFACT STRENGTH BASED ON EDGE STATISTICS

(75) Inventors: Victor Hyeong-Seok Ha, North York (CA); Yeong-Taeg Kim, Irvine, CA (US); Sangkeun Lee, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1384 days.

(21) Appl. No.: 11/399,846

(22) Filed: Apr. 6, 2006

(65) Prior Publication Data

US 2007/0237241 A1    Oct. 11, 2007

(51) Int. Cl.
*H04N 5/21* (2006.01)

(52) U.S. Cl. .................. 348/607; 348/701; 348/420.1; 375/240.27; 375/240.29; 382/268

(58) Field of Classification Search .............. 348/607, 348/700, 701, 420.1, 421.1; 375/240.27, 375/240.24, 240.29; 382/268, 266
See application file for complete search history.

(56) References Cited

U.S. PATENT DOCUMENTS

| | | | |
|---|---|---|---|
| 2005/0013494 A1* | 1/2005 | Srinivasan et al. | 382/233 |
| 2007/0058726 A1* | 3/2007 | Ha et al. | 375/240.24 |
| 2007/0206871 A1* | 9/2007 | Jalil et al. | 382/233 |

* cited by examiner

*Primary Examiner* — Jefferey F Harold
*Assistant Examiner* — Jean W Désir
(74) *Attorney, Agent, or Firm* — Kenneth L. Sherman, Esq.; Michael Zarrabian, Esq.; Myers Andras Sherman & Zarrabian LLP

(57) ABSTRACT

A method and apparatus estimates the strength of block artifacts in compressed video is described. Block artifacts are associated with the block-based image/video compression schemes. The block artifacts deteriorate the quality of compressed image and video, especially at low bit rates. A deblocking method measures the strength of the block artifacts at each block boundary and adjusts the deblocking parameters accordingly to improve the performance of the overall deblocking process. A method and device to measure the strength of block artifacts based on the global and local edge information of the current picture is provided.

31 Claims, 6 Drawing Sheets

400

ESTIMATION OF BLOCK ARTIFACT STRENGTH BASED ON EDGE STATISTICS

FIELD OF THE INVENTION

The present invention relates in general to noise reduction/removal from compressed image/video, and more particularly to reduction/removal of block artifacts that are associated with block-based compression/coding schemes.

BACKGROUND OF THE INVENTION

Visual communication systems and applications advocate larger screens and higher resolutions. This tendency is amplified with the appearance of large CRT, LCD, PDP, projector High-Definition (HD) TVs, and digitally processed and stored visual information in the form of MPEG, DVD, DV, etc., in the consumer electronics market. In this era of visual communication, it becomes very important to improve the quality of images and videos that are displayed on large screens at high resolution. Digital TV (DTV) sets often implement the video post-processing functions that improve and enhance the image/video signals to be displayed. The post-processors in these TV sets perform many functions including scaling, noise reduction, detail enhancement, color enhancement, etc., to achieve the goal.

Compression noise reduction, such as MPEG noise reduction, is one of the main functions implemented by the post-processor in a DTV set. Digital video contents may be processed and encoded by a variety of digital compression techniques to overcome the problem with data bandwidth limitation in the communication networks. The current Digital TV (DTV) broadcasting in the U.S. uses the MPEG-2 international video compression standard to compress the digital video contents. The DVD video contents are also processed by MPEG-2. The HD contents may be processed by MPEG-2, MPEG-4, or H.264. These compressed digital videos contain varying degrees of artifacts that deteriorate the quality of displayed video images and scenes. These artifacts in MPEG-processed digital videos are referred to herein as "MPEG noise", or "compression noise". The compression noise reduction is, then, a process that detects and removes these annoying MPEG noises from the digital videos before displaying to the screen.

There are different types of MPEG compression noises. One class of MPEG noises includes block artifacts which are appearances of undesired, superfluous edges or discontinuities at the block boundaries. Block artifacts arise in images/videos that are compressed by block-based coding schemes such as JPEG, MPEG, and H.26X. In these coding schemes, a picture is divided into an array of N-by-N rectangular macroblocks (e.g., N is usually 16). Then, each macroblock is again sub-divided into M-by-M (e.g., M is usually 8) sub-blocks. Each sub-block is typically processed by an 8-by-8 Discrete Cosine Transform (DCT), Quantization, Zig-zag scanning, and Entropy coding, independent of other sub-blocks. Because each sub-block (and each macroblock) is processed independently, a critical portion of the image/video data that connects neighboring blocks is often lost and the superfluous edges and discontinuities appear at the block boundaries. Block artifacts become more severe as the image/video is compressed more, i.e., at higher compression rates.

The human visual system (HVS) is extremely efficient at recognizing block artifacts. This is because humans have an extensive amount of visual knowledge and experience about what the world (objects and scenes) looks like. It is very easy, therefore, for humans to detect the artificially generated discontinuities and edges appearing across the picture at a regular interval. Even very small discrepancies are detected without much effort. On the other hand, machines lack the full-extent of visual knowledge that humans have. Specially, simple conventional electronic devices or software programs that are built to detect and remove block artifacts rely only on very restricted inter-pixel, inter-block, or inter-frame relationships. Complete and accurate removal of block artifacts are, therefore, extremely difficult for these machines.

BRIEF SUMMARY OF THE INVENTION

In one embodiment, the present invention provides a method and system for reducing/removing block artifacts that are associated with block-based compression/coding schemes such as JPEG, MPEG, H.26x, etc., thereby improving picture qualities of the compressed/coded image/video.

As block artifacts appear with varying strengths at different spatial locations within a digital image, if a single deblocking filter is uniformly applied to all block boundaries, either the strong block artifacts are not adequately removed or fine image features are blurred. As such, an effective method for removing block artifacts according to the present invention measures the strength of the block artifact at each block boundary and adjusts the parameters of the deblocking filter accordingly. As a result, more filtering is applied to strong block artifacts while less filtering is applied to weak block artifacts. Such adaptive deblocking filtering improves the performance of the overall deblocking process.

Further, the present invention provides a method and system for effectively measuring or estimating the strength of block artifacts at each block boundary, utilizing global and local edge statistics computed from the input image (frame or field picture).

Other embodiments, features and advantages of the present invention will be apparent from the following specification taken in conjunction with the following drawings.

DETAILED DESCRIPTION OF THE INVENTION

Figure 1:
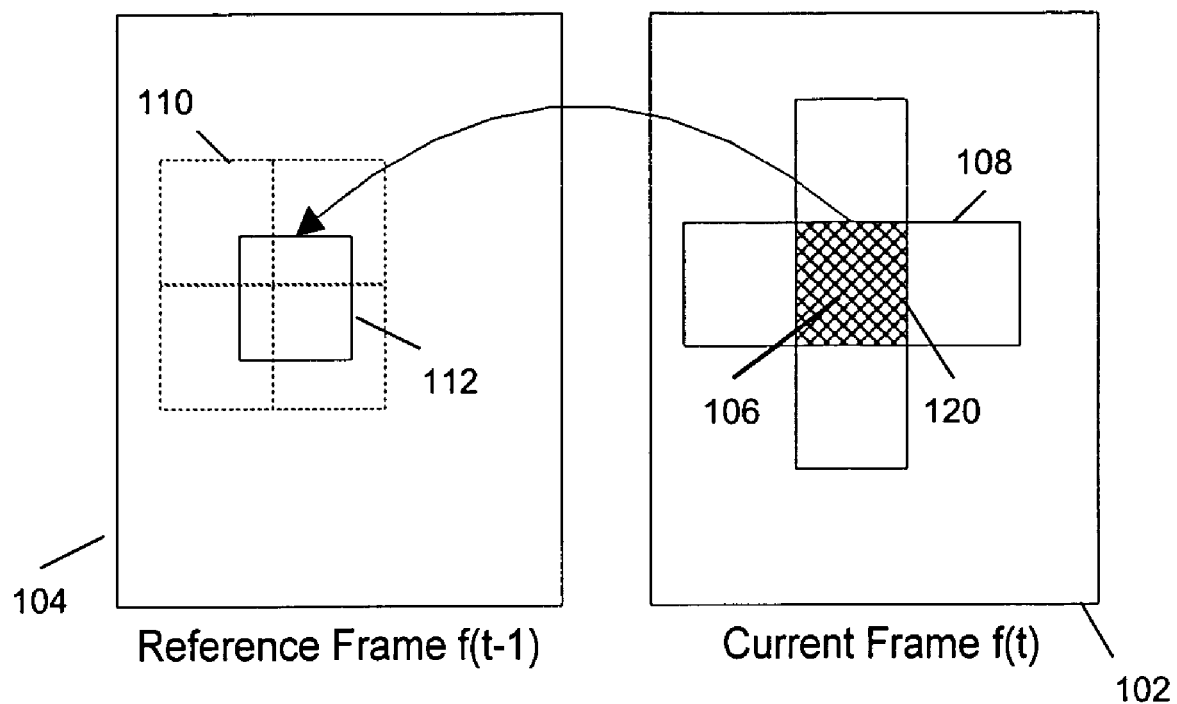
FIG. 1 shows an example process of motion estimation, according to an embodiment of the present invention.

Video compression herein refers to decreasing the amount of data (e.g., number of bits per second), that represents a given video signal by exploiting spatiotemporal and statistical redundancy within the video signal. Examples of such compression techniques include Motion-JPEG, MPEG, H.26x, AVI, etc., wherein the degree of compression of digital video is represented by a range of measurable parameters, such as compression rates. Digital video includes a sequence of images, or video, generated by e.g. sampling and quantization applied to analog video signals.

Digital images and videos that are compressed by block-based compression techniques (e.g., JPEG, MPEG, H.26x) suffer from various compression noises, including block artifacts. Block artifacts are not part of real image features and are reduced/removed according to the present invention in order to improve the visual quality of the picture. As such, in one embodiment, the present invention provides a method and system for reducing/removing block artifacts that are associated with block-based compression/coding schemes such as JPEG, MPEG, H.26x, etc., thereby improving picture qualities of the compressed/coded image/video.

As block artifacts appear with varying strengths at different spatial locations within a digital image, if a single deblocking filter is uniformly applied to all block boundaries, either the strong block artifacts are not adequately removed or fine image features are blurred. As such, an effective method for removing block artifacts according to the present invention measures the strength of the block artifact at each block boundary and adjusts the parameters of the deblocking filter accordingly. As a result, more filtering is applied to strong block artifacts while less filtering is applied to weak block artifacts. Such adaptive deblocking filtering improves the performance of the overall deblocking process. Further, the present invention provides a method and system for effectively measuring or estimating the strength of block artifacts at each block boundary, utilizing global and local edge statistics computed from the input image (frame or field picture).

In order to better describe reduction of block artifacts from compressed/coded image/video by measuring the strength of block artifacts at each block boundary according to the present invention, a general discussion about an embodiment of measuring the strength of block artifacts according to the present invention is provided. Then, an example method that uses global and local edge statistics to estimate the strength of block artifacts according to the present invention is described.

Measuring Strength of Block Artifacts

Block artifacts appear as discontinuity across the boundaries of macroblocks and DCT blocks in a coded input frame. The strength of block artifacts may be measured in terms of the extent and magnitude of the discontinuity at the block boundary. Strong block artifacts extend longer along the boundary with a more severe level of discontinuity (as measured by pixel value differences) across the blocks. Weak block artifacts span shorter distances along the boundary and the discontinuity across blocks is less visible.

Block artifacts are removed or reduced by a deblocking process. An example deblocking process includes spatial low-pass filtering across a block boundary. The performance of the deblocking process can benefit from the knowledge of the strength of block artifacts. For example, heavy low-pass filtering is applied to strong block artifacts while moderate low-pass filtering is applied to weak block artifacts. Incorrect measurement of the block artifact strength can have negative impact. If heavy low-pass filtering is applied across the block boundary with weak block artifacts, fine image features may be destroyed or blurred. On the other hand, if moderate low-pass filtering is applied to strong block artifacts, the artifacts may not be reduced sufficiently.

The strength of block artifacts is closely related to the magnitude of quantization error in two blocks that share the block boundary. Quantization is the compression step in which data is lost. Thus, higher quantization error indicates more loss of data and more severe discontinuity across blocks.

Two main sources that affect quantization error are: (1) the quantization step size (or quantization parameter), and (2) residual error computed as the difference between the prediction and original blocks.

Quantization Step: Quantization discards the signal information falling between quantization levels or steps. As the quantization step size is increased, more data becomes subject to loss with larger quantization error. When the quantization step size is known precisely for each block, the strength of block artifacts may be inferred in the following manner. For larger quantization step sizes, stronger block artifacts are expected. For small quantization step sizes, only weak block artifacts are possible. However, the quantization step size provides only an indication of the strength of block artifacts. Because quantization error is correlated with the signal, the strength of block artifacts may vary at the same quantization step size depending on the actual values and distribution of signal, i.e., block residue data.

Residual Error: The residual error (or residue block) is computed as the difference between the original and prediction blocks. The residue block is further processed through DCT, quantization, and entropy coding. A prediction block is obtained from either an intra or inter(motion) prediction process. In intra-prediction, a prediction block is constructed from the pixels in the neighboring blocks of the same picture. For example, MPEG-4 Part 10 (H.264) provides nine different ways to construct an intra-prediction block for the luma component. An intra-prediction block in H.264 contains slowly-varying low-activity patterns. As such, the residual error is likely to be high if the original block contains high-activity patterns that do not match the prediction blocks closely. In inter-prediction, a prediction block is computed from a reference picture via a motion-estimation process. FIG. 1 shows an example process 100 for a current frame f(t) 102 and previous reference frame f(t−1) 104. The current frame 102 includes current block (shaded) 106 and surrounding blocks 108, and the reference frame 104 includes blocks 110 and prediction block 112. An example block boundary 120 is also shown in FIG. 1.

In FIG. 1, one block 106 in the current frame is predicted from the previous frame within the search range 110 independently without considering neighbor blocks such as a block 108. Similarly, a predicted block for the block 108 may be quite different from the original block 108. Therefore, decoded blocks for the blocks 106 and 108 may be different from the original blocks, and a block boundary between the two blocks may be seen.

The residual error is high if the prediction block does not closely match the original block, which happens when the motion search is unsuccessful and returns poor results. When a residue block contains a large amount of data in the transform domain (i.e., the residual error is high), there are two main approaches for processing such data. In one approach, a rate controller assigns more bits to represent the residue block while maintaining the same quantization step size. An increase in block artifacts is not expected in this case. In the other approach, the quantization step size is increased to keep the amount of data transmitted at a constant. It is likely that block artifacts become more severe with this approach. In general, the available bandwidth is limited for video communications and, even with the effort of a good rate controller, the amount of data in residue blocks is closely related to an increase in the strength of block artifacts.

Based on the above discussion, the quantization step size and the residual error are relatively good indicators of the strength of block artifacts. The quantization step size and residual error of each block are available in the video encoder and decoder. The deblocking process that has a direct access to the encoder/decoder may use such indicators to measure the strength of block artifacts. If these indicators are not available to the deblocking process, they need to be estimated (i.e., estimating quantization step size or residual error).

In one aspect, the present invention provides a method to estimate the strength of block artifacts, by analyzing the edge statistics. The parameters of the deblocking process are adjusted according to the estimated strength of block artifacts. An example implementation is described below.

Computing Information on Edge Statistics

Three types of information on edge statistics of the picture: Edge ratio, Edge value, and Edge count. As described below, such information is computed globally for the entire picture, and then again locally for each of N-by-N sub-sections of the picture (i.e., non-overlapped N-by-N regions of the whole image where e.g. one image can be separated into 3×4 regions), wherein the local information is useful when the block artifacts appear only on parts of the picture, for example, due to high motion of localized regions/objects.

Figure 2:
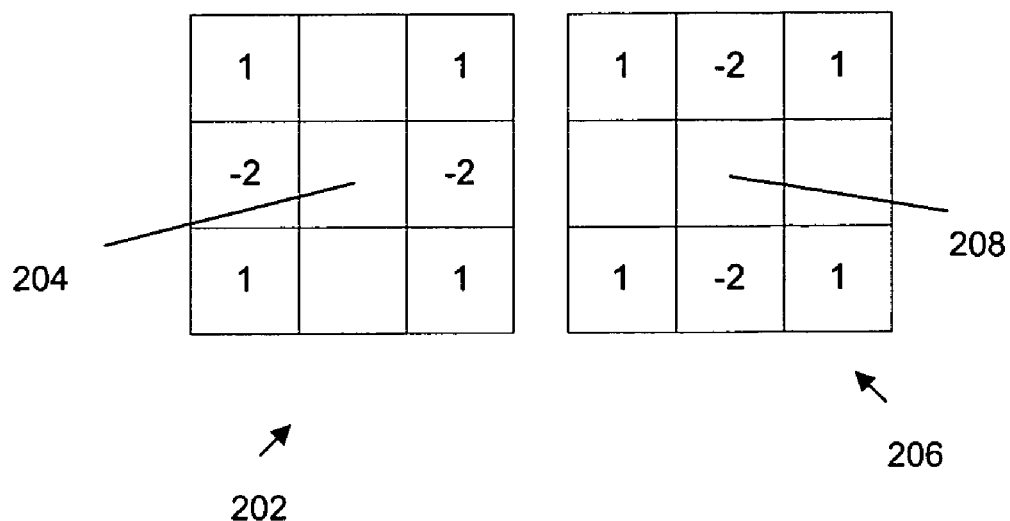
FIG. 2 shows an example process of Sobel Edge Operation, according to an embodiment of the present invention.
Figure 2:
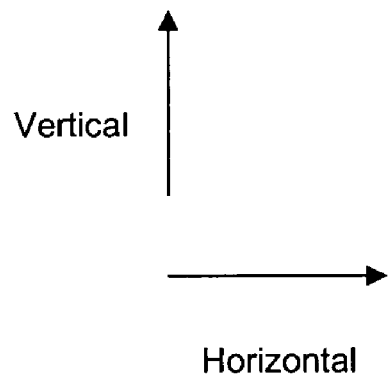
Figure 3:
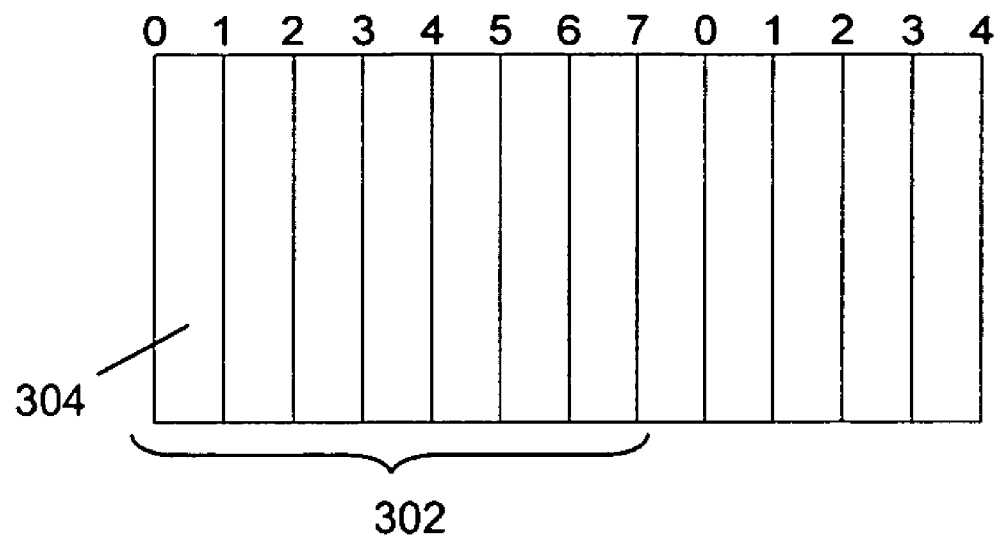
FIG. 3 shows an example grouping of Pixel Columns by index i=x % 8=0 . . . 7, according to an embodiment of the present invention.
Figure 3:

Edge Ratio is computed both globally and locally. First, as shown by an example process 200 in FIG. 2, a Sobel edge detection operator is applied (any other appropriate edge detection may be applied), to each pixel 204 of the input block 202 in the horizontal direction. Blocks 202 and 206 are separate operations for finding edges along the horizontal direction and vertical directions, respectively, at the center pixels 204 and 208, respectively. The edge detection operator is then applied in the vertical direction, to result in the output block 206 having pixels 208. Center pixels 204 and 208 are at the same location. Two directional edge operators (202 and 206) are performed consequentially for horizontal and vertical directions on the center pixel location. And the result is finally obtained at the center location 208. A pixel is counted as an edge pixel if the result of the edge operation falls within a given range, for example, greater than a first threshold $\alpha$ but less than a second threshold $\beta$. Each directional operation provides pixel difference at the current position (center) between neighborhood. Then, as shown by example process in FIG. 3, the total number of the edge pixels in the picture 202 of FIG. 2 are counted, wherein the columns in the picture are separated into e.g. 8 groups 302 of columns 304, according to an index i=(x % 8)=0 . . . 7, where x is the column number and % is a modulo operation. The number of edge pixels is counted separately for each group i=0 . . . 7. Then, an edge count edgecnt$_b$ is determined for a column 304 located at the block boundary i=7, and another edge count edgeCnt$_m$ that is the largest count value in the 8 groups beside the one at the block boundary. The edge ratio is the ratio between these two counts, edgecnt$_m$ divided by edgecnt$_b$. If edgeCnt$_b$ at the block boundary is the largest number in the 8 groups, the second largest number is assigned to edgeCnt$_m$. The edge ratio is smaller than a unity in this case. Otherwise, the edge ratio is greater than a unity. As noted, the steps are repeated to obtain the edge ratio along the vertical direction for rows.

Edge Value is the average magnitude of edge pixels located at block boundaries. The edge value is computed by averaging the output values of Sobel edge operator that are within the range ($\alpha$, $\beta$). The edge value is computed globally or locally for each sub-section wherein one edge value is computed for the horizontal boundary and another edge value is computed for the vertical boundary in each sub-section. A sub-section refers to the separated non-overlapping area of an input image, while macroblocks/blocks are the area whose size is standardized and fixed, for example, 16-by-16/8-by-8 by MPEG group.

Edge Count is the total number of edge pixels located at block boundaries. The Edge Count is computed globally or locally for each sub-section, wherein one edge count is computed for the horizontal boundary and another edge count is computed for the vertical boundary in each sub-section defined by a user input. The number of sub-sections in an input image can be changed by the user.

The Edge Ratio indicates the presence and extent of block artifacts. If the Edge Ratio is large, e.g., greater than 75%, a negligible amount of block artifacts is expected. As the Edge Ratio decreases, more block artifacts are likely to appear across all block boundaries in the sub-section. Usually a sub-section is larger than a macroblock. The size of a sub-section is dependent on an input image while the size of macroblock/block is fixed.

Generally, a large Edge Value means that real edge features are present at block boundaries across the sub-section. In that situation, strong filtering operation that smoothes out the block boundaries should be avoided. However, if the Edge Ratio is very small, the large edge value indicates that the block artifacts are very strong and there is a large difference in pixel values across the block boundaries. Usually, the large edge value (pixel difference between neighbor pixels) indicates that there are large edges or block artifacts at the boundary. It is difficult to determine if the value is real edge value or artifact. However, if the Edge Ratio is very small at that boundary, we can say that block artifact boundary exists statistically. In that case filtering to smooth block boundaries is performed.

A large Edge Count means that many edge features are present at block boundaries. If the Edge Ratio is small, a large Edge Count means that many block artifacts exist. If the Edge Ratio is large, a large Edge Count means that the picture has many edge features near block boundaries and should not be smoothed by strong filtering.

The three statistical parameters (Edge Ratio, Edge Value, Edge Count) describe the edge content of the image. When combined, the three parameters provide useful information. The statistical information indicates if the contents of sub-section have been distorted or not when it was transformed by an unknown encoder. The strength and extent of block artifacts are estimated with appropriate thresholds as the three parameters take a value from the range [0, N]. For Edge Ratios, N is 100%. For Edge Values, N is the maximum output magnitude of Sobel edge operator. For Edge Counts, N is the total number of pixels at block boundaries along either horizontal or vertical direction. Table 1 below summarizes the results when each parameter is given one of two levels: high or low. An exemplary interpretation of these 8 situations is provided for an illustration purpose.

| Strength of Block Artifacts versus Edge Statistics | | | |
| --- | --- | --- | --- |
| Edge Ratio | Edge Value | Edge Count | Block Artifacts: Strength/Extent |
| High | High | High | Unlikely:Strong/Heavy |
| High | High | Low | Unlikely:Strong/Mild |
| High | Low | High | Possible:Weak/Heavy |
| High | Low | Low | Unlikely:Weak/Mild |
| Low | High | High | Yes:Strong/Heavy |
| Low | High | Low | Yes:Strong/Mild |

-continued

Strength of Block Artifacts versus Edge Statistics

| Edge Ratio | Edge Value | Edge Count | Block Artifacts: Strength/Extent |
|---|---|---|---|
| Low | Low | High | Yes:Weak/Heavy |
| Low | Low | Low | Yes:Weak/Mild |

In the first row of Table 1, when all three parameters are measured to be high, there are many edge pixels at the block boundaries with large edge values. There are as many edge pixels with large edge values inside the blocks as well. Due to high Edge Ratio, it is difficult to deduce that these edge pixels are block artifacts. It is more likely that the picture contains strong edge features that form regular patterns across the entire picture.

In the second row of Table 1, there are strong edge pixels but not many of them are present. It is likely that the picture contains strong edge features in some small parts of the picture.

In the third row of Table 1, there are many weak edge pixels in the picture. Since the Edge Ratio is high, we speculate that the picture contains: (1) high activity patterns or (2) high frequency noise, either with or without block artifacts.

In the fourth row of Table 1, there are only a few weak edge pixels. Since the Edge Ratio is still high, it is very unlikely that block artifacts are present in the picture. This is one extreme case where no deblocking is required.

In the fifth row of Table 1, there are many strong edge pixels. The low value of Edge Ratio indicates that most of these edge pixels are block artifacts. This is the other extreme case where the strongest deblocking is required across the entire picture.

In the sixth row of Table 1, strong block artifacts are likely in some small parts of the picture.

In the seventh row of Table 1, many weak block artifacts are present.

In the last row of Table 1, a few weak block artifacts are present.

The deblocking filtering process obtains useful estimates of the strength and extent of block artifacts from the three statistical parameters (Edge Ratio, Edge Value, Edge Count) on edge contents. For example, the deblocking filter strength is adjusted according to the estimated strength of block artifacts, while the extent of block artifacts (when computed locally) is used to apply deblocking process only to certain regions of the picture. Based on the actual value of each edge parameter, a variety of processing decisions can be made in adjusting the deblocking process.

Figure 4:
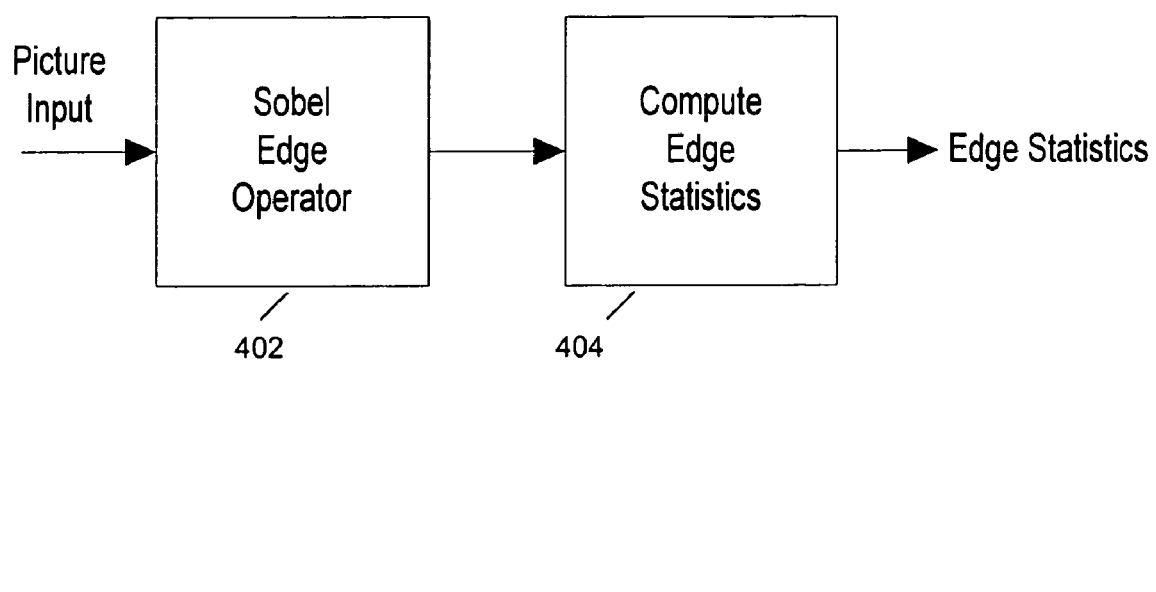
FIG. 4 shows a functional block diagram of an example arrangement for computing edge statistics, according to an embodiment of the present invention.

FIG. 4 shows a functional block diagram of an embodiment of an Edge Statistics Estimator 400 that estimates the edge statistical parameters (Edge Ratio, Edge Value, Edge Count), according to an embodiment of the present invention. The Edge Statistics Estimator 400 comprises a Sobel Edge Operator unit 402 which performs Sobel edge operations on an input image, as described above. The Edge Statistics Estimator 400 further includes an Edge Statistics Computation unit 404 which calculates the three edge statistics (Edge Ratio, Edge Value, Edge Count) as described above.

Figure 5:
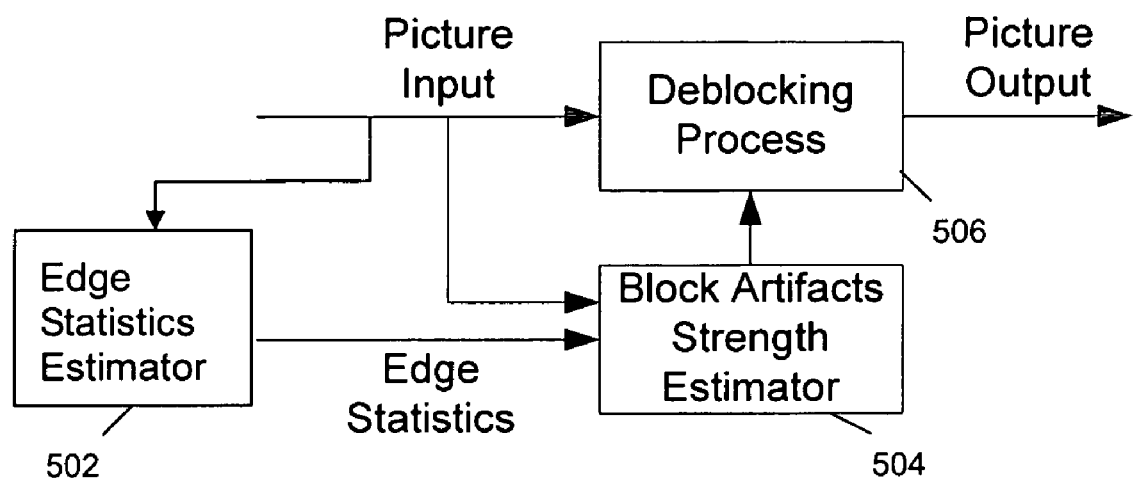
FIG. 5 shows a functional block diagram of an example system implementing a compressed image deblocking process, according to an embodiment of the present invention.

FIG. 5 shows a functional block diagram of an embodiment of a system 500 that performs edge detection, collects edge statistics in a block 502, and adjusts the deblocking process in a block 506 according to the three statistical edge parameters in a block 504. The system 500 comprises an Edge Statistics Estimator 502 (such estimator 400 of FIG. 4), Block Artifacts Strength Estimator 504 and Deblocking Processor 506. The Edge Statistics Estimator 502 estimates the edge statistical parameters as described above with FIG. 4. Block Artifacts Strength Estimator 504 uses the edge statistics to estimate strength of blocking artifacts in the input picture as described by example in relation to Table 1 above. The deblocking Processor 506 performs deblocking operations on the input image based on blocking artifact strength estimates from the Block Artifacts Strength Estimator such as described by example in relation to Table 1 above. The deblocking processor 506 can be any deblocking algorithms in the literatures that need the strength information of block artifacts.

Figure 6:
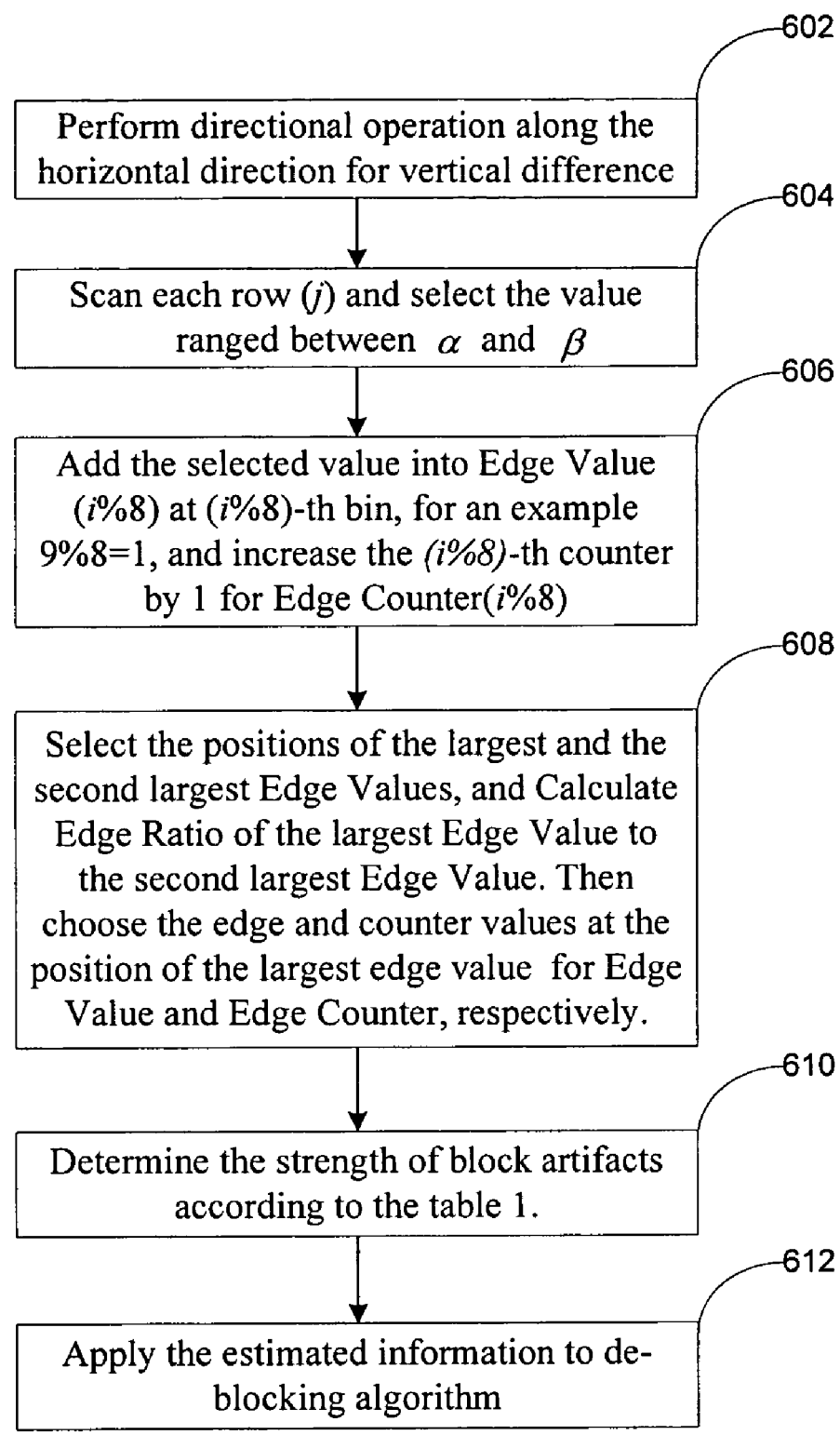
FIG. 6 shows a flowchart of example steps of compressed image deblocking process, according to an embodiment of the present invention.

FIG. 6 shows a flowchart of example steps of compressed image deblocking process, including the overall process for estimating the strength of block artifacts, according to an embodiment of the present invention. First, directional operation is performed along the horizontal direction for vertical differences over an input image in (step 602). It is noted that to simplify understanding, only horizontal directional operation will be considered. However, both horizontal and vertical operations are executed. Each row (j) of the differential image resulting from step 602 is scanned and the value in certain range is selected (step 604). All of the selected values are summed into 8 different bins according to the column locations (i %8), and each bin's counter (Edge Counter(i %8)) is increased by 1 when each Edge Value bin (Edge Value(i %8)) is added by the selected edge value in block (step 606). After performing the above procedures over the input image, the positions of the largest and the second largest edge values are selected, and Edge Ratio of the largest edge value to the second largest edge value is calculated. Then the edge and counter values at the position of the largest edge value for Edge Value and Edge Counter is chosen, respectively (step 608). Finally, the strength of block artifacts is determined according to the Table 1 above (step 610), which can be applied to any de-blocking algorithm to reduce the artifacts (step 612). To reflect the regional block artifacts (e.g., only small area of an input image has block artifacts), the present invention separates the input image into several non-overlapping area and follows the same procedures as explained before.

As such, the present invention provides method (and system) to estimate the strength of block artifacts in compressed video is described. Further, a deblocking method is provided which measures the strength of the block artifacts at each block boundary and adjusts the deblocking parameters accordingly to improve the performance of the overall deblocking process. A method to measure the strength of block artifacts based on the global and local edge information of the current picture is also provided.

While the present invention is susceptible of embodiments in many different forms, there are shown in the drawings and herein described in detail, preferred embodiments of the invention with the understanding that this description is to be considered as an exemplification of the principles of the invention and is not intended to limit the broad aspects of the invention to the embodiments illustrated. The aforementioned example architectures above according to the present invention can be implemented in many ways, such as program instructions for execution by a processor, as logic circuits, as ASIC, as firmware, etc., as is known to those skilled in the art. Therefore, the present invention is not limited to the example embodiments described herein. The present invention has been described in considerable detail with reference to certain preferred versions thereof; however, other versions are possible. Therefore, the spirit and scope of the appended claims should not be limited to the description of the preferred versions contained herein.

What is claimed is:

1. A method for reducing block artifacts associated with block-based image coding to improve image quality of a sequence coded image frames, comprising:
   measuring the strength of the block artifacts in an input frame utilizing global and local edge statistics of the input frame, wherein edge statistics are estimated including calculating edge ratio, edge value and edge count for each block in a frame; and
   performing adaptive deblocking based on the measured block artifact strength, to generate an output frame with improved image quality relative to the coded input image frame, wherein performing adaptive deblocking further includes adjusting deblocking filtering based on one or more of estimated edge ratio, estimated edge value and estimated edge count, wherein adjusting deblocking filtering further includes:
      if edge value is higher than a selected threshold, then avoiding filtering operation that smoothes out the block boundaries.

2. The method of claim 1 wherein performing adaptive deblocking further include adjusting deblocking filtering of the input frame as a function the measured block artifact strength.

3. The method of claim 2 wherein adjusting deblocking filtering further comprises applying more filtering to strong block artifacts.

4. The method of claim 2 wherein adjusting deblocking filtering further comprises applying less filtering to weak block artifacts.

5. The method of claim 1 wherein measuring the strength of the block artifacts further includes estimating the strength of the block artifacts at each block boundary in the input frame.

6. The method of claim 5 wherein measuring the strength of the block artifacts further includes estimating the strength of block artifacts at each block boundary utilizing global and local edge statistics of the input frame.

7. The method of claim 5 wherein estimating further includes estimating the strength of block artifacts at each block boundary as a function of coding quantization step size and residual error.

8. The method of claim 1 wherein global and local edge statistics comprises calculating edge ratio, edge value, and edge count for each block in a frame.

9. The method of claim 8 wherein edge statistics are computed globally for the entire input frame and then again locally for each non-overlapped N-by-N region of the entire input frame wherein local information is useful when block artifacts appear only on parts of the input frame.

10. The method of claim 1 wherein global and local edge statistics contain calculations: edge ratio, edge count, and edge value; and
    wherein edge statistics are computed globally for the entire input frame and then again locally for each non-overlapped N-by-N region of the entire input frame wherein local information is useful when block artifacts appear only on parts of the input frame.

11. A method for reducing block artifacts associated with block-based image coding to improve image quality of a sequence coded image frames, comprising:
    measuring the strength of the block artifacts in an input frame by estimating the strength of the block artifacts at each block boundary in the input frame as a function of global and local edge statistics of the input frame;
    performing adaptive deblocking based on the measured block artifact strength, to generate an output frame with improved image quality relative to the coded input image frame;
    estimating edge statistics for the input frame including estimating edge value, wherein estimating edge value further includes:
       determining average magnitude of edge pixels located at block boundaries;
       performing edge detection operation to each pixel a block in the frame, wherein a pixel is counted as an edge pixel if the edge detection operation falls within a certain range; and
       averaging the output values of edge detection operation.

12. The method of claim 11 wherein estimating edge statistics further includes estimating edge ratio.

13. The method of claim 12 wherein estimating the edge ratio comprises:
    performing edge detection operation to each pixel a block in the frame in to determine edges in the block, and
    determining the edge ratio as a function of number of edges in the block.

14. The method of claim 13 wherein performing edge detection operation further includes counting a pixel as an edge pixel if the edge detection operator falls within a certain range.

15. The method of claim 11 wherein estimating edge statistics further includes estimating edge count.

16. The method of claim 15 wherein estimating edge count further includes:
    performing edge detection operation to each pixel a block in the frame, wherein a pixel is counted as an edge pixel if the edge detection operation falls within a certain range; and
    determining the total number of edge pixels located at block boundaries.

17. The method of claim 11 wherein estimating edge statistics further includes calculating edge ratio, edge value and edge count for each block in a frame.

18. The method of claim 17 further comprising estimating the presence and extent of block artifacts based on the estimated edge statistics.

19. The method of claim 17 wherein performing adaptive deblocking further includes adjusting deblocking filtering based on one or more of estimated edge ratio, estimated edge value and estimated edge count.

20. The method of claim 19 wherein adjusting deblocking filtering further includes:
    if edge value is higher than a selected threshold, then avoiding filtering operation that smoothes out the block boundaries.

21. The method of claim 19 wherein adjusting deblocking filtering further includes:
    if edge value is lower than a selected threshold, then performing filtering operation that smoothes out the block boundaries.

22. The method of claim 19 wherein adjusting deblocking filtering further includes:
    if edge ratio is lower than a first threshold, and edge count is higher than a second threshold, then performing filtering operation that smoothes out the block boundaries.

23. A system for reducing block artifacts with block-based image coding to improve image quality of a sequence coded image frames, comprising:
    an estimator that measures the strength of the block artifacts in an input frame by estimating the strength of the block artifacts at each block boundary in the input frame as a function of global and local edge statistics of the input frame, wherein the estimator estimates edge statistics for the input frame by estimating edge ratio, edge value and edge count for each block in a frame; and an adaptive deblocker that performing adaptive deblocking based on the measured block artifact strength, to generate an output frame with improved image quality relative to the coded input image frame, wherein the adaptive deblocker performs adaptive deblocking further by adjusting deblocking filtering based on one or more of estimated edge ratio, estimated edge value and estimated edge count, and the adaptive deblocker adjusts deblocking filtering by determining if edge value is higher than a selected threshold, and if so, avoiding filtering operation that smoothes out the block boundaries.

24. The system of claim 23 wherein the estimator estimates edge statistics further by estimating edge ratio.

25. The system of claim 23 wherein the estimator estimates edge statistics further by estimating edge value.

26. The system of claim 23 wherein the estimator estimates edge statistics further by estimating edge count.

27. The system of claim 23 wherein the estimator uses the edge statistics to estimate the presence and extent of block artifacts.

28. The system of claim 23 wherein the adaptive deblocker adjusts deblocking filtering by determining if edge value is lower than a selected threshold, and if so, then performing filtering operation that smoothes out the block boundaries.

29. The system of claim 23 wherein the adaptive deblocker adjusts deblocking filtering by:
   determining if edge ratio is lower than a first threshold, and edge count is higher than a second threshold,
   then performing filtering operation that smoothes out the block boundaries.

30. A method for reducing block artifacts associated with block-based image coding to improve image quality of a sequence coded image frames, comprising:
   measuring the strength of the block artifacts in an input frame by estimating the strength of the block artifacts at each block boundary in the input frame as a function of global and local edge statistics of the input frame;
   performing adaptive deblocking based on the measured block artifact strength, to generate an output frame with improved image quality relative to the coded input image frame;
   estimating edge statistics for the input frame by estimating edge count, wherein estimating edge count further includes:
      performing edge detection operation to each pixel a block in the frame, wherein a pixel is counted as an edge pixel if the edge detection operation falls within a certain range; and
      determining the total number of edge pixels located at block boundaries.

31. A method for reducing block artifacts associated with block-based image coding to improve image quality of a sequence coded image frames, comprising:
   measuring the strength of the block artifacts in an input frame by estimating the strength of the block artifacts at each block boundary in the input frame as a function of global and local edge statistics of the input frame;
   performing adaptive deblocking based on the measured block artifact strength, to generate an output frame with improved image quality relative to the coded input image frame; and
   estimating edge statistics for the input frame including estimating edge ratio, wherein estimating the edge ratio comprises:
      performing edge detection operation to each pixel a block in the frame in to determine edges in the block; and
      determining the edge ratio as a function of number of edges in the block, wherein the edge ratio is a value representing $count_m$ divided by $count_b$, where $count_b$ is a number of edge pixels at a block boundary, where $count_m$ is a number of edge pixels in a subsection of the image not including the block boundary.

* * * * *